United States Patent [19]

Swarup et al.

[11] Patent Number: 5,547,757
[45] Date of Patent: Aug. 20, 1996

[54] COLOR-CLEAR COMPOSITE COATINGS HAVING IMPROVED INTERCOAT ADHESION

[75] Inventors: Shanti Swarup, Gibsonia; Brij N. Sharma, Pittsburgh; B. Keith Johnston, Arnold, all of Pa.

[73] Assignee: PPG Industries, Inc., Pittsburgh, Pa.

[21] Appl. No.: 303,264

[22] Filed: Sep. 8, 1994

Related U.S. Application Data

[62] Division of Ser. No. 47,904, Apr. 19, 1993, Pat. No. 5,384,367.

[51] Int. Cl.$^6$ .......................... B32B 27/38; B32B 27/40; B05D 1/36
[52] U.S. Cl. .................. 428/413; 427/407.1; 427/410; 428/423.1; 428/500
[58] Field of Search ................ 427/410, 386, 427/407.1, 409; 428/413, 423.1, 500

[56] References Cited

U.S. PATENT DOCUMENTS

| | | | |
|---|---|---|---|
| 3,415,901 | 12/1968 | Schramm et al. | 260/830 |
| 3,454,622 | 7/1969 | Schramm et al. | 260/471 |
| 3,458,527 | 7/1969 | Schramm et al. | 260/307 |
| 3,767,624 | 10/1973 | Clarke | 260/59 |
| 3,988,257 | 10/1976 | Harrison et al. | 427/410 |
| 4,094,925 | 6/1978 | Jellinek et al. | 260/836 |
| 4,122,055 | 10/1978 | Tugukuni et al. | 523/409 |
| 4,126,747 | 11/1978 | Coherd, III et al. | 546/245 |
| 4,322,456 | 3/1982 | Martin | 427/195 |
| 4,375,498 | 3/1983 | Le Minez et al. | 427/410 |
| 4,476,271 | 10/1984 | Kano et al. | 524/377 |
| 4,522,981 | 6/1985 | Geist | 525/124 |
| 4,552,815 | 11/1985 | Dreher et al. | 427/409 |
| 4,650,718 | 3/1987 | Simpson et al. | 428/413 |
| 4,681,811 | 7/1987 | Simpson et al. | 428/413 |
| 4,699,814 | 10/1987 | Ambrose et al. | 427/407.1 |
| 4,703,101 | 10/1987 | Singer et al. | 528/87 |
| 4,737,403 | 4/1988 | Simpson et al. | 428/273 |
| 4,764,430 | 8/1988 | Blackburn et al. | 428/413 |
| 4,917,955 | 4/1990 | Porter, Jr. et al. | 427/410 |
| 4,927,868 | 5/1990 | Schimmel et al. | 523/439 |
| 5,196,485 | 3/1993 | McMonigal et al. | 525/327.3 |
| 5,241,001 | 8/1993 | Kania et al. | 427/410 |
| 5,300,328 | 4/1994 | Rehfuss | 427/407.1 |
| 5,356,669 | 10/1994 | Briggs | 427/410 |
| 5,356,670 | 10/1994 | Rehfuss et al. | 427/407.1 |

FOREIGN PATENT DOCUMENTS

0485990A2  5/1992  European Pat. Off.

*Primary Examiner*—Diana Dudash
*Attorney, Agent, or Firm*—Krisanne Shideler; Kenneth J. Stachel

[57] ABSTRACT

Curable coating compositions based on polyepoxide-containing polymers and polyacid curing agents are disclosed. The polyepoxide-containing polymers contain one or more pendant groups of carbamate, urea or urethane groups. The coating compositions are useful as clear coats in composite color plus clear coatings where the pendant groups provide for intercoat adhesion.

11 Claims, No Drawings

COLOR-CLEAR COMPOSITE COATINGS HAVING IMPROVED INTERCOAT ADHESION

This is a division of application Ser. No. 08/047,904, filed Apr. 19, 1993, now U.S. Pat. No. 5,384,367.

FIELD OF THE INVENTION

The present invention relates to curable compositions based on polyepoxides and polyacid curing agents, to the use of such compositions in a process for preparing multi-layered coated articles comprising a pigmented or colored base coat and a transparent or clear topcoat, and to the coated articles themselves.

BACKGROUND OF THE INVENTION

Color-plus-clear coating systems involving the application of a colored or pigmented base coat to a substrate followed by the application of a transparent or clear topcoat to the base coat have become conventional as original finishes for automobiles. The color-plus-clear systems have outstanding gloss and distinctness of image.

However, a problem frequently encountered with such systems is poor adhesion between coating layers ("intercoat adhesion"), particularly when a base coat or clear coat layer is applied over another clear coat layer during on-line repairs of original equipment paint jobs, and when a clear coat is applied over an electrocoat layer or a base coat is applied over a clear coat layer during custom two-tone painting. Two-tone painting involves the application of a base coat and clear coat system to an entire automotive part or portion thereof, after which an area is covered or "masked" so that the remaining exposed area can be painted with a different colored base coat followed by a clear coat. In these situations a base coat may be applied on top of a clear coat layer or on top of an electrocoated layer which has clear coat overspray on it.

It would be desirable to provide a color-plus-clear coating system which is useful as an original finish for automobiles and which avoids the intercoat adhesion problems of the prior art systems.

SUMMARY OF THE INVENTION

In accordance with the present invention, a curable composition based on a polyepoxide and a polyacid curing agent is provided. Also provided are a process for applying the composite coating to a substrate and the resultant coated article. A film-forming composition is applied to a substrate to form a base coat followed by applying to the base coat a film-forming composition to form a transparent topcoat over the base coat. The transparent topcoat, or clear coat, is derived from a polyepoxide and a polyacid curing agent. The polyepoxide is a polyepoxide-containing polymer which contains one or more pendant groups of the structure:

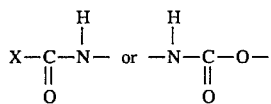

where X is

or —O.

Preferably, the pendant groups are terminal groups and are of the structure:

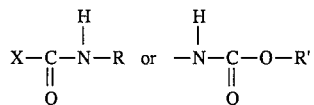

where X is

or —O and R is H or alkyl of 1–18, preferably 1–6 carbon atoms, or R is bonded to X and forms part of a five- or six-membered ring and R' is alkyl of 1–18, preferably 1–6 carbon atoms.

DETAILED DESCRIPTION

The film-forming composition of the base coat can be any of the compositions useful in coatings applications, particularly automotive applications. The film-forming composition comprises a resinous binder and a pigment to act as the colorant. Particularly useful resinous binders are acrylic polymers, polyesters, including alkyds, and polyurethanes.

The acrylic polymers are copolymers of one or more alkyl esters of acrylic acid or methacrylic acid optionally together with one or more other polymerizable ethylenically unsaturated monomers. These polymers may be either of the thermoplastic type or the thermosetting crosslinking type. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such acrylonitrile and methacrylonitrile; vinyl and vinylidene halides such as vinyl chloride and vinylidene fluoride and vinyl esters such as vinyl acetate.

Where the polymer is of the crosslinking type, suitable functional monomers may be used in addition to the other acrylic monomers mentioned above and include, for example, acrylic acid, methacrylic acid, hydroxyethyl acrylate, hydroxyethyl methacrylate, hydroxypropyl acrylate, and hydroxypropyl methacrylate. The coating composition in such cases contains a crosslinking agent such as an aminoplast. Other crosslinking agents such as polyisocyanates including blocked polyisocyanates may also be used. Also, the acrylic polymer can be prepared with N-(alkoxymethyl)acrylamides and N-(alkoxymethyl)methacrylamides which result in self-crosslinking acrylic polymers.

Besides acrylic polymers, the resinous binder for the base coat composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane, and pentaerythritol.

Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Where it is desired to produce air-drying alkyd resins, suitable drying oil fatty acids may be used and include those derived from linseed oil, soya bean oil, tall oil, dehydrated castor oil, or tung oil.

The polyesters and alkyd resins contain free hydroxyl and/or carboxyl groups which are available for further crosslinking reactions. Suitable crosslinking agents are the amine or amide-aldehyde condensates (aminoplasts) or the polyisocyanate curing agents as are well known in the art.

Polyurethanes can also be used as the resinous binder of the base coat. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product.

The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

Most of the polymers prepared as described above are organic solvent-based polymers, although acrylic polymers can be prepared via aqueous emulsion polymerization techniques and used as aqueous-based base coat compositions. Water-based base coats in color-plus-clear compositions are disclosed in U.S. Pat. No. 4,403,003, and the resinous compositions used in preparing these base coats can be used in the practice of this invention. Also, water-based polyurethanes such as those prepared in accordance with U.S. Pat. No. 4,147,679 can be used as the resinous binder in the base coat. Further, water-based coatings such as those described in U.S. Pat. No. 5,071,904 can be used as the base coat.

The base coat also contains pigments to give it color. Compositions containing metallic flake pigmentation are useful for the production of so-called "glamour metallic" finishes chiefly upon the surface of automobile bodies. Proper orientation of the metallic pigments results in a lustrous shiny appearance with excellent flop. By flop is meant the visual appearance of brightness or lightness of the metallic coating with a change in viewing angle, that is, a change from 90 to 180 degrees. The greater the change from light to dark appearance with respect to viewing angle, the better the flop. Flop is important because it accentuates the lines of a curved surface such as on an automobile body. Suitable metallic pigments include in particular aluminum flake, copper bronze flake and mica.

Besides the metallic pigments, the base coating compositions of the present invention may contain non-metallic color pigments conventionally used in surface coatings including inorganic pigments such as titanium dioxide, iron oxide, chromium oxide, lead chromate, and carbon black, and organic pigments such as phthalocyanine blue and phthalocyanine green. In general, the pigment is incorporated into the coating composition in Mounts of about 1 to 80 percent by weight based on weight of coating solids. The metallic pigment is employed in amounts of about 0.5 to 25 percent by weight based on weight of coating solids.

If desired, the base coat composition may contain additional materials well known in the art of formulated surface coatings. These would include surfactants, flow control agents, thixotropic agents, fillers, anti-gassing agents, organic cosolvents, catalysts, and other customary auxiliaries. These materials can constitute up to 40 percent by weight of the total weight of the coating composition.

The base coating compositions can be applied to various substrates to which they adhere. The compositions can be applied by conventional means including brushing, dipping, flow coating, spraying and the like, but they are most often applied by spraying. The usual spray techniques and equipment for air spraying and electrostatic spraying and either manual or automatic methods can be used.

The base coating compositions can be applied over virtually any substrate including wood, metals, glass, cloth, plastic, foam, including elastomeric substrates and the like. They are particularly useful in applications over metals, particularly metals which are primed with an electrodeposition primer, and elastomeric substrates that are found on motor vehicles.

During application of the base coat composition to the substrate, a film of the base coat is formed on the substrate. Typically, the base coat thickness will be about 0.01 to 5, preferably 0.1 to 2 mils in thickness.

After application of the base coat to the substrate, a film is formed on the surface of the substrate by driving solvent, i.e., organic solvent or water, out of the base coat film by heating or by an air drying period. Preferably, the heating will only be sufficient and for a short period of time to ensure that the topcoat can be applied to the base coat without the former dissolving the base coat composition. Suitable drying conditions will depend on the particular base coat composition, and on the ambient humidity with certain water-based compositions, but in general a drying time of from about 1 to 5 minutes at a temperature of about 80°–250° F. (20°–121° C.) will be adequate to ensure that mixing of the two coats is minimized. At the same time, the base coat film is adequately wetted by the topcoat composition so that satisfactory intercoat adhesion is obtained. Also, more than one base coat and multiple top coats may be applied to develop the optimum appearance. Usually between coats, the previously applied coat is flashed; that is, exposed to ambient conditions for about 1 to 20 minutes.

The clear film-forming composition which forms the transparent top coat is a liquid crosslinkable composition comprising a polyepoxide and a polyacid curing agent. The polyepoxide is a polyepoxide-containing polymer having on average 2 or more 1,2-epoxy groups per molecule and contains one or more pendant groups of the structure:

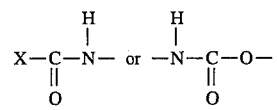

where X is

or —O.

By pendant is meant that the groups in question do not form recurring groups in the polyepoxide polymer chain.

Rather, the groups extend laterally from the polymer chain and are preferably a terminal group.

Examples of the polyepoxide-containing polymers which can be used are epoxide or epoxy-containing acrylic polymers. The epoxy-containing acrylic polymer is a copolymer of an ethylenically unsaturated monomer having at least one epoxy group, at least one polymerizable ethylenically unsaturated monomer which is free of epoxy groups, and at least one ethylenically unsaturated monomer containing one or more pendant carbamate, urea or urethane groups of the structure:

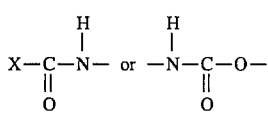

where X is

or —O. The pendant groups are preferably of the structure:

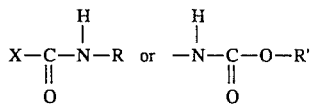

where X is

or —O and R is H or alkyl of 1–18, preferably 1–6 carbon atoms, or R is bonded to X and forms part of a five- or six-membered ring and R' is alkyl of 1–18, preferably 1–6 carbon atoms. More preferably, when the pendant groups are urethane, i.e.,

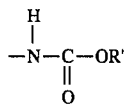

they will contain two urethane groups, i.e.,

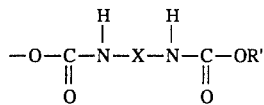

where R' is as described above and X is an organic radical associated with a diisocyanate, such as aliphatic, including cycloaliphatic radicals and aromatic radicals. X can be a substituted radical such as aryl substituted alkylene radicals and alkyl substituted arylene radicals.

Examples of ethylenically unsaturated monomers containing epoxy groups are those containing 1,2-epoxy groups and include glycidyl acrylate, glycidyl methacrylate, and alkyl glycidyl ether.

Examples of ethylenically unsaturated monomers which do not contain epoxy groups are alkyl esters of acrylic and methacrylic acid containing from 1 to 20 atoms in the alkyl group. Specific examples of these acrylates and methacrylates are those mentioned above as suitable for the acrylic polymers in the base coat. Examples of other copolymerizable ethylenically unsaturated monomers are vinyl aromatic compounds such as styrene, vinyl toluene and alpha-methylstyrene dimer, nitriles such as acrylonitrile, vinyl and vinylidene halides such as vinyl chloride and vinylidene fluoride, and vinyl esters such as vinyl acetate. Acid-functional copolymerizable ethylenically unsaturated monomers such as acrylic and methacrylic acid are preferably not used because of the possible reaction between the epoxy and acid groups.

Ethylenically unsaturated monomers having pendant functional groups of structure:

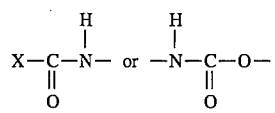

where X is

or —O may be incorporated into the acrylic polymer by copolymerizing the acrylic monomers with a carbamate, urea, or urethane functional vinyl monomer, for example a carbamate functional alkyl ester of methacrylic acid. These carbamate functional alkyl esters may be prepared by reacting, for example, a hydroxyalkyl carbamate, such as the reaction product of ammonia and ethylene carbonate or propylene carbonate, with methacrylic acid or anhydride. Other suitable monomers are, for instance, the reaction product of an hydroxyalkyl methacrylate, isophorone diisocyanate, and a hydroxyalkyl carbamate or hydroxyethyl ethylene urea, or the reaction product of an hydroxyalkyl methacrylate, isophorone diisocyanate, and an alcohol containing 1–18, preferably 1–6 carbon atoms, such as methanol, ethanol, n-propanol, isopropanol, n-butanol, lauryl alcohol, and the like, with n-butanol being preferred. Other suitable monomers include the reaction product of an ethylenically unsaturated isocyanate such as dimethyl-m-isopropenyl benzyl isocyanate and an alcohol containing 1–18, preferably 1–6 carbon atoms, such as methanol, ethanol, n-propanol, isopropanol, n-butanol, lauryl alcohol, and the like, with n-butanol being preferred.

The epoxy group-containing ethylenically unsaturated monomer is preferably used in amounts of from about 5 to 70, more preferably from 20 to 65 percent by weight of the total monomers used in preparing the epoxy-containing acrylic polymer. Of the remaining polymerizable ethylenically unsaturated monomers, preferably from 25 to 85 percent, more preferably from 30 to 80 percent by weight of the total monomers are the alkyl esters of acrylic and methacrylic acid containing from 1 to 20 carbon atoms in the alkyl group, and about 0 to 50 percent, preferably from about 2 to 40 percent based on weight of total monomers are other ethylenically unsaturated monomers; i.e., the vinyl aromatic compounds, nitriles, vinyl and vinylidene halides and vinyl esters.

The monomers containing the pendant groups of the structure:

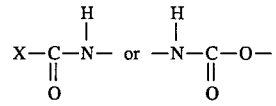

where X is

or —O are present in amounts of 0.1 to 10, preferably 0.5 to 5 percent by weight based on weight of total monomers. Preferably, such monomers will have an equivalent weight (based on equivalent of such pendant groups) of 5000 to 100,000, preferably 7500 to 75,000.

In preparing the epoxy-containing acrylic polymer, the epoxide-functional monomers and the other ethylenically unsaturated monomers can be mixed and reacted by conventional free radical initiated organic solution polymerization techniques in the presence of suitable catalysts such as organic peroxides, including benzoyl peroxide, t-butyl perbenzoate, t-amyl peracetate, or ethyl-3,3-di(t-amylperoxy) butyrate or azo compounds, such as N,N'-azobis(isobutyronitrile) or alpha,alpha-dimethylazobis(isobutyronitrile). The polymerization may be carried out in an organic solvent in which the monomers are soluble. Suitable solvents are aromatic solvents such as xylene and toluene, ketones such as methyl amyl ketone or ester solvents such as ethyl 3-ethoxypropionate.

The polyepoxide-containing polymers typically have a weight average molecular weight between about 1000 and 20,000, preferably about 1000 to 10,000, and more preferably about 1000 to 5000. The molecular weight is determined by gel permeation chromatography using a polystyrene standard.

Preferably, the polyepoxide-containing polymers have a glass transition temperature (Tg) less than 50° C., more preferably less than 30° C. The Tg is described in PRINCIPLES OF POLYMER CHEMISTRY, Flory, Cornell University Press, Ithaca, N.Y., 1953, pages 52–57. The Tg can be calculated as described by Fox in Bull. Amer. Physic. Society, 1,3, page 123 (1956). The Tg can be measured experimentally by using a penetrometer such as a Du Pont 940 Thermomedian Analyzer. The Tg of the polymers as used herein refers to the calculated values unless otherwise indicated.

Preferably, the curable compositions of the present invention are liquid compositions, and the polyepoxide-containing polymer is present in the composition in amounts of about 10 to 90, preferably from about 20 to 50 percent by weight based on total weight of resin solids.

In addition to the polyepoxide-containing polymers described above, certain polyepoxide monomers and oligomers can also be used. Examples of these materials are described in U.S. Pat. No. 4,102,942 in column 3, lines 1–16. Specific examples of such low molecular weight polyepoxides are 3,4-epoxycyclohexylmethyl 3,4-epoxycyclohexanecarboxylate and bis(3,4-epoxycyclohexylmethyl) adipate. These low molecular weight polyepoxides may be used to increase the cure response and solids content of the curable compositions. When used, they are present in amounts up to 30, preferably 5 to 30 percent by weight based on the total weight of resin solids in the crosslinkable composition.

The composition of the present invention further includes a polyacid component having a high average acid functionality. More specifically, the polyacid curing agent of the present invention on average contains more than two acid groups per molecule, more preferably three or more, and most preferably four or more, such acid groups being reactive with the polyepoxide to form a crosslinked coating as indicated by its resistance to organic solvent. The parameter of greater than two acid groups per molecule is intended to encompass mixtures of polyacid curing agents in which di-functional curing agents are mixed with tri- or higher functionality polyacid curing agents. Polyacid curing agent mixtures including up to about 50 percent of a di-functional curing agent with a tri-functional curing agent are suitable. Higher percentages of di-functional material can be used if the remainder of the curing agent mixture is higher than tri-functional or if the polyacid curing agent mixture is used with a highly functional polyepoxide component. The acid functionality is preferably carboxylic acid, although acids such as phosphorus-based acid may be used. Preferably, the polyacid curing agent is a carboxylic acid terminated material having, on average, greater than two carboxylic acid groups per molecule. Among the polyacid curing agents which may be used are carboxylic acid group-containing polymers such as acrylic polymers, polyesters, and polyurethanes; oligomers such as ester group-containing oligomers; and monomers.

The preferred polyacid curing agents are ester group-containing oligomers. Examples include half-esters formed from reacting polyols and 1,2-acid anhydrides or acid functional polyesters derived from polyols and polyacids or anhydrides. The half-esters are preferred because they are of relatively low molecular weight and are quite reactive with epoxy functionality enabling the formulation of high solids fluid compositions while maintaining outstanding properties such as gloss and distinctness of image.

The half-ester is obtained by reacting a polyol and a 1,2-acid anhydride under conditions sufficient to open the anhydride ring, forming the half-ester with substantially no polyesterification occurring. Such reaction products are of relatively low molecular weight with narrow molecular weight distribution and low viscosity. They provide lower volatile organic contents in the coating composition yet still exhibit excellent properties in the resultant coating. By substantially no polyesterification occurring is meant that the carboxyl groups formed by the reaction of the anhydride are not further esterified by the polyol in a recurring manner. Therefore, less than ten, preferably less than five percent by weight high molecular weight polyester is formed.

Two reactions may occur in combining the anhydride and the polyol together under suitable reaction conditions. The desired reaction mode involves opening the anhydride ring with hydroxyl; i.e.,

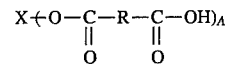

where X is the residue of the polyol after the polyol has been reacted with a 1,2-dicarboxylic acid anhydride, R is an organic moiety associated with the anhydride and A is at least 2.

Subsequently, carboxylic acid groups formed by opening the anhydride ring may react with hydroxyl groups to give off water via a condensation reaction. This latter reaction is not desired since it can lead to a polycondensation reaction resulting in products with higher molecular weights.

To achieve the desired reaction, the 1,2-acid anhydride and polyol are usually contacted by mixing the two ingredients together in a reaction vessel. Preferably, the reaction is conducted in an inert atmosphere such as nitrogen and in the presence of a solvent to dissolve the solid ingredients and/or to lower the viscosity of the reaction mixture. Examples of suitable solvents are high boiling materials and include ketones such as methyl amyl ketone, diisobutyl ketone, methyl isobutyl ketone; aromatic hydrocarbons such as toluene and xylene; as well as other organic solvents such as dimethyl formamide and N-methyl-pyrrolidone.

For the desired ring opening reaction and half-ester formation, a 1,2-dicarboxylic anhydride is used. Reaction of a polyol with a carboxylic acid instead of an anhydride would result in esterification by condensation, eliminating water, which must be removed by distillation. Moreover, under these conditions undesired polyesterification is more likely to occur.

The reaction temperature is preferably low; that is, no greater than 135° C., preferably less than 120° C., and usually within the range of 70°–135° C., preferably 90°–1200° C. Temperatures greater than 135° C. are undesirable because they promote polyesterification, whereas temperatures less than 70° C. are undesirable because of sluggish reaction. The time of reaction can vary somewhat depending primarily on the temperature of reaction. Usually the reaction time will be from as low as 10 minutes to as high as 24 hours.

The equivalent ratio of anhydride to hydroxyl on the polyol is preferably at least about 0.8:1 (the anhydride is considered monofunctional) to obtain maximum conversion to the desired half-ester. Ratios less than 0.8:1 can be used but result in increased formation of lower functionality half-esters.

Among the anhydrides which can be used in the formation of the desired half-esters and polyesters are those which, exclusive of the carbon atoms in the anhydride moiety, contain from about 2 to about 30 carbon atoms. Examples include aliphatic, including cycloaliphatic, olefinic and cycloolefinic anhydrides and aromatic anhydrides. Substituted aliphatic aromatic anhydrides are also included within the definition of aliphatic and aromatic provided the substituents do not adversely affect the reactivity of the anhydride or the properties of the resultant polymer. Examples of substituents include chloro-, alkyl, and alkoxy-groups. Examples of anhydrides include succinic anhydride, methylsuccinic anhydride, dodecenyl succinic anhydride, octadecenyl succinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride and maleic anhydride.

Among the polyols which can be used are simple polyols; that is, those containing from about 2 to 20 carbon atoms, as well as oligomeric polyols and polymeric polyols such as polyester polyols, polyurethane polyols and acrylic polyols. Among the simple polyols are diols, triols, tetrols, and mixtures thereof. Examples of preferred polyols are those containing from 2 to 10 carbon atoms such as aliphatic polyols. Specific examples include but are not limited to di-trimethylol propane (bis(2,2-dimethylol)dibutyl ether); pentaerythritol; 1,2,3,4-butanetetrol; sorbitol; trimethylol propane; trimethylol ethane; 1,2,6-hexanetriol; glycerin; trishydroxyethyl isocyanurate; dimethylol propionic acid; 1,2,4-butanetriol; trimethylol propane/epsilon-caprolactone triols; ethylene glycol; 1,2-propanediol; 1,3-propanediol; 1,4-butanediol; 1,5-pentanediol; 1,6-hexanediol; neopentyl glycol; diethylene glycol; dipropylene glycol; 1,4-cyclohexanedimethanol and 2,2,4-trimethylpentane-1,3 diol.

With regard to oligomeric polyols, suitable polyols are polyols made by reacting diacids with triols, such as trimethylol propane/cyclohexane diacid and trimethylol propane/adipic acid. With regard to polymeric polyols, the polyester polyols are prepared by esterification of an organic polycarboxylic acid or anhydride thereof with organic polyols and/or an epoxide. Usually, the polycarboxylic acids and polyols are aliphatic or aromatic dibasic acids or acid anhydrides and diols.

The polyols which are usually employed in making the polyester include trimethylol propane, di-trimethylol propane, alkylene glycols such as ethylene glycol, neopentyl glycol, and other glycols such as hydrogenated bisphenol A, cyclohexane diol, cyclohexanedimethanol, the reaction products of lactones and diols, for example, the reaction product of epsilon-caprolactone and ethylene glycol, hydroxy-alkylated bisphenols, polyester glycols, for example, poly(oxytetramethylene)glycol and the like.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, methyl hexahydrophthalic acid, adipic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid. However, the use of the higher functionality polycarboxylic acids is not preferred because of resultant high viscosities.

Besides the polyester polyols formed from polybasic acids and polyols, polylactone-type polyesters can also be used. These products are formed from the reaction of a lactone such as epsilon-caprolactone and a polyol such as ethylene glycol, diethylene glycol, or trimethylolpropane.

Besides polyester polyols, polyurethane polyols such as polyester-urethane polyols which are formed from reacting an organic polyisocyanate with a polyester polyol such as those described above can be used. The organic polyisocyanate is reacted with a polyol so that the OH/NCO equivalent ratio is greater than 1:1 so that the resultant product contains free hydroxyl groups. The organic polyisocyanate which is used in preparing the polyurethane polyols can be aliphatic or aromatic or a mixture thereof. Diisocyanates are preferred. Higher polyisocyanates such as triisocyanates can be used, but result in higher viscosities.

Examples of suitable diisocyanates are 4,4'-diphenylmethane diisocyanate, and 4,4'-methylenebis(cyclohexyl isocyanate). Examples of suitable higher functionality polyisocyanates are polymethylene polyphenol isocyanates.

It is also possible to use acid-functional acrylic crosslinkers made by copolymerizing methacrylic acid and/or acrylic acid monomers with other ethylenically unsaturated copolymerizable monomers as the polyacid curing agent. Alternatively, acid-functional acrylics can be prepared from hydroxy-functional acrylics reacted with cyclic anhydrides.

The polyacid curing agent is present in the crosslinkable composition in amounts of about 10 to 90, preferably 20 to 50 percent by weight based on total weight of resin solids.

The curable compositions of the present invention may optionally contain an aminoplast resin for improved resistance to water spotting. Typically, when used, the aminoplast resin is present in the composition in amounts up to about 30 percent by weight, more preferably from about 2 to 20 percent by weight based on total weight of resin solids in the curable composition.

Optionally, the crosslinkable composition can contain silane functionality which can be incorporated into the composition by using a reactive silane group-containing material such as gamma-methacryloxypropyltrimethoxysilane or mercaptopropyltrimethoxysilane which can be used in the preparation of the epoxy group-containing acrylic polymer. Such materials co-react with the polymerizing monomers or polymers forming a polymer with silane curing groups. Alternately, a silane group-containing material such as methyltrimethoxysilane in an amount up to 20, preferably 2 to 15 percent by weight, can be included in the composition. The silane functionality results in a lower temperature cure.

The composition may optionally contain an aliphatic monocarboxylic acid containing at least 6, preferably from 8 to 22 carbon atoms such as described in U.S. Pat. No. 4,764,430. Examples of such acids include lauric acid and isostearic acid, which as preferred. These monocarboxylic acids, when used, are present in amounts up to 15 percent, preferably 0.5 to 10 percent by weight based on total weight of resin solids.

The composition may also contain an anhydride, preferably an anhydride which is a liquid at 25° C. The presence of such an anhydride in the composition provides for improved cure response. Examples of suitable anhydrides include dodecenyl succinic anhydride and alkyl-substituted hexahydrophthalic anhydrides wherein the alkyl group contains up to 7 carbon atoms, more preferably up to 4 carbon atoms, such as methyl hexahydrophthalic anhydride. The amount of the anhydride which is used in the curable composition can vary from about 0 to 40 percent, preferably from about 5 to 25 percent by weight based on total weight of resin solids.

To form one-package compositions, the film-forming composition of the present invention is substantially free of basic esterification catalyst. Although the absence of catalyst has a negative effect on the cure of the composition, it provides for a stable composition and is also beneficial in reducing or eliminating cure inhibition between layers in a color-plus-clear formulation when the base coat contains an acid-catalyzed resinous binder. The high functionality associated with the polyepoxide and polyacid provide for sufficient cure response. In a preferred embodiment, the composition of the present invention has no or only small amounts of basic esterification catalyst such that the composition is stable for a time sufficient to allow formulation of the composition as a single component; i.e., one-package, composition.

To form multi-package or multi-component compositions in which the polyepoxide and polyacid curing agent are present in separate packages and combined shortly before application, an esterification catalyst to promote cure can be included in the composition. A number of such catalysts are known in the art. These catalysts include basic materials such as secondary amine catalysts, for example, piperidine; tertiary amine catalysts such as N,N-dimethyldodecylamine, pyridine, and N,N-dimethylaniline; ammonium compounds, including tetrabutylammonium bromide, tetrabutylammonium hydroxide, and tetrabutylammonium acetate; phosphonium compounds, including ethyltriphenylphosphonium acetate and tetrabutyl phosphonium bromide; and other ammonium and phosphonium salts. When used, the catalysts are present in amounts up to 5, preferably 0.5 to 3 percent by weight based on total weight of resin solids.

The curable composition of the present invention may also contain a copolymer of an alpha olefin such as 1-octene or 1-decene and an olefinically unsaturated anhydride such as maleic anhydride. The anhydride group in such a polymer may be ring-opened with ethanol. These copolymers improve the humidity resistance of the resultant cured coating. The use of these copolymers in polyepoxide-polyacid curable compositions is described more fully in U.S. Pat. No. 4,927,868. When used, the copolymers are present in amounts up to 25 percent, preferably 5 to 20 percent by weight based on total weight of resin solids of the curable composition.

Other optional ingredients, such as plasticizers, antioxidants, UV light absorbers and stabilizers may be formulated into the curable compositions of the present invention. When used, these ingredients are present (on an individual basis) in amounts up to 10 percent, preferably from about 0.1 to 5 percent by weight based on total weight of resin solids of the curable composition.

The equivalent ratio of the reactants present in the compositions adjusted such that for each equivalent of carboxyl (anhydride, if present is considered monofunctional) there is 0.3 to 3.0, preferably 0.8 to 1.5 equivalent of epoxy.

The curable compositions preferably are formulated into liquid high solids coating compositions; that is, compositions containing greater than 40 percent, preferably greater than 50 percent by weight resin solids. The solids content is determined by heating a sample of the composition to 105°–110° C. for 1–2 hours to drive off the volatile material. Although the compositions are preferably liquid coating compositions, they may be formulated as powder coating compositions.

The curable compositions of the invention may be applied to a substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the coating composition to the substrate, the coated substrate is heated to cure the coating. In the curing operation, solvents are driven off and the film-forming materials of the coating composition are crosslinked. The heating or curing operation is usually carried out at a temperature in the range of from 160°–350° F. (71°–177° C.) but if needed, lower or higher temperatures may be used as necessary to activate crosslinking mechanisms. The thickness of the coating is usually from about 0.5–5, preferably 1.2–3 mils.

Preferably, the compositions of the present invention are used to formulate clear coats for use in a color-plus-clear application. In a color-plus-clear application, a composite coating is applied to a substrate. The process comprises applying to the substrate a pigmented or colored film-forming composition to form a base coat and applying to the base coat a second film-forming composition to form a transparent top coat, or clear coat, over the base coat.

The clear top coat composition is applied to the base coat by any of the conventional coating techniques mentioned above, with spray applications preferred. Typically the clear top coat is applied to the base coat via a wet-on-wet technique before the base coat has been cured. The two coatings are then heated to conjointly cure both coating layers. Curing conditions such as described above may be used.

The curable compositions of the present invention provide excellent intercoat adhesion. By this is meant that the curable composition can be applied as a coating to a substrate which has already been coated with one or more layers of coatings with the same or different compositions, or additional layers of coatings with the same or different compositions may be applied on top of the present coating composition, and the present coating composition will maintain adhesion to the layers to which it is adjacent. Intercoat adhesion is typically measured by scribing a coated substrate with a "cross-hatch" pattern and securely applying a piece of adhesive tape onto the scribe. The tape is then removed and the substrate examined for removal of the coating layers. A rating is given based on the area and layers of coating material removed by the tape. As shown in the following examples, the curable compositions of the present invention have excellent intercoat adhesion as measured by this test.

The invention will further be described by reference to the following examples. Unless otherwise indicated, all parts are by weight.

EXAMPLE

The following examples (A–D) illustrate the preparation of acrylic monomers having pendant urethane and/or carbamate groups.

EXAMPLE A

An acrylic monomer having pendant carbamate groups, i.e.,

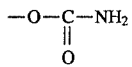

in admixture with butyl methacrylate was prepared from the following ingredients:

| Ingredient | Weight in Grams |
| --- | --- |
| Isophorone diisocyanate (IPDI) | 2664.0 |
| Dibutyl tin dilaurate | 27.6 |
| 2,6-di-t-butyl methyl phenol | 7.9 |
| Butyl methacrylate | 846.0 |
| Hydroxypropyl carbamate | 1713.6 |
| Hydroxyethyl methacrylate | 1248.0 |

A suitable reactor was charged with the first four ingredients and heated to a temperature of 60° C. The hydroxypropyl carbonate was added to the reaction mixture over 3 hours. The reaction mixture was then held at 60° C. until the isocyanate equivalent weight became constant. The hydroxyethyl methacrylate was then added over 2 hours, and the reaction held until infrared analysis indicated the absence of isocyanate. The product was diluted with 2076.0 g of butyl methacrylate. The final product had a solids content of 66% and had a number average molecular weight of 622 as determined by gel permeation chromatography.

EXAMPLE B

An acrylic monomer mixture having pendant urethane groups, i.e.,

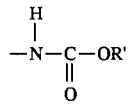

where R'=butyl, was prepared as in Example A, replacing the hydroxypropyl carbamate with an equal number of moles of n-butanol. The final product had a solids content of 66% and had a number average molecular weight of 510 as determined by gel permeation chromatography.

EXAMPLE C

An acrylic monomer mixture having pendant urethane groups was prepared as in Example A, replacing the hydroxypropyl carbamate with an equal number of moles of methanol. The final product had a solids content of 66% and had a number average molecular weight of 485 as determined by gel permeation chromatography.

EXAMPLE D

An acrylic monomer mixture having pendant urethane groups was prepared as in Example A, replacing the hydroxypropyl carbamate with an equal number of moles of lauryl alcohol. The final product had a solids content of 66% and had a number average molecular weight of 739 as determined by gel permeation chromatography.

The following examples (E–N) illustrate the preparation of epoxy-containing acrylic polymers prepared with the acrylic monomers of Examples A–D (Examples G–N) without these acrylic monomers (Examples E and F).

EXAMPLE E

An epoxy-functional acrylic polymer containing 60 weight percent glycidyl methacrylate was prepared with the following ingredients:

| | Weight in grams |
| --- | --- |
| Charge I | |
| Xylene | 83.76 |
| EEP (ethyl 3-ethoxypropionate) | 244.31 |
| Charge II | |
| Glycidyl methacrylate | 540.00 |
| Methyl methacrylate | 5.25 |
| Butyl methacrylate | 157.55 |
| Styrene | 36.75 |
| alpha-Methyl styrene dimer | 10.44 |
| EEP rinse | 7.50 |
| Charge III | |
| LUPERSOL 555 M-60[1] | 90.00 |
| EEP | 45.00 |
| EEP rinse | 7.50 |
| Charge IV | |
| Methyl methacrylate | 3.75 |
| Butyl methacrylate | 112.55 |
| Styrene | 26.25 |
| alpha-Methyl styrene dimer | 7.47 |
| EEP rinse | 7.50 |
| Charge V | |
| t-Butyl perbenzoate | 9.00 |
| EEP | 4.50 |
| EEP rinse | 3.75 |
| Charge VI | |
| t-Butyl perbenzoate | 9.00 |
| EEP | 3.00 |
| EEP rinse | 3.75 |
| Charge VII | |
| t-Butyl perbenzoate | 9.00 |
| EEP | 4.50 |
| EEP rinse | 3.75 |

[1]t-amyl peracetate available from Atochem, Inc.

Charge I was added to a suitable reactor and heated to reflux. At reflux, Charge III was added over a period of 4 hours. Fifteen minutes after starting Charge III, Charge II was added over a period of 2.5 hours. Thirty minutes after the completion of Charge II, Charge IV was added over thirty minutes. After completion of Charge III, the reaction mixture was held at reflux for 1 hour and then cooled to 130° C. Charge V was added over a period of one hour and the reaction mixture held at 130° C. for thirty minutes. Charge VI was added over a period of one hour and the reaction mixture again held at 130° C. for thirty minutes. Charge VII was added over one hour and the reaction mixture held at 130° C. for two hours before cooling. The solids content of the reaction product was adjusted to about 62.5% with xylene. The reaction product had a weight average molecular weight of about 2800 as determined by gel permeation chromatography using a polystyrene standard. The theoretical epoxy equivalent weight based on solids was about 235.

EXAMPLE F

An epoxy-functional acrylic polymer containing 35 weight percent glycidyl methacrylate was prepared with the following ingredients:

|  | Weight in grams |
| --- | --- |
| Charge I | |
| Xylene | 67.76 |
| EEP | 126.04 |
| Charge II | |
| Glycidyl methacrylate | 490.00 |
| Methyl methacrylate | 20.81 |
| Butyl methacrylate | 635.02 |
| Styrene | 20.81 |
| EEP rinse | 10.00 |
| Charge III | |
| LUPERSOL 555 M-60 | 140.00 |
| EEP | 70.00 |
| EEP rinse | 10.00 |
| Charge IV | |
| Methyl methacrylate | 7.19 |
| Butyl methacrylate | 218.98 |
| Styrene | 7.19 |
| EEP rinse | 10.00 |
| Charge V | |
| t-Butyl perbenzoate | 14.00 |
| EEP | 10.00 |
| EEP rinse | 5.00 |
| Charge VI | |
| t-Butyl perbenzoate | 14.00 |
| EEP | 10.00 |
| EEP rinse | 5.00 |
| Charge VII | |
| t-Butyl perbenzoate | 14.00 |
| EEP | 10.00 |
| EEP rinse | 5.00 |

The polymer was prepared as in Example E. The reaction product had a solids content of about 74% and a weight average molecular weight of about 2800 as determined by gel permeation chromatography using a polystyrene standard. The theoretical epoxy equivalent weight based on solids was about 408.

EXAMPLE G

An epoxy-functional acrylic polymer containing 60 weight percent glycidyl methacrylate and in which the monomer mixture of Example A (1.9 weight percent HEMA-IPDI-hydroxypropyl carbamate monomer) used in place of a portion of the styrene, was prepared according to the procedure of Example E. The reaction product had a solids content of about 62.5% and a weight average molecular weight of about 3818 as determined by gel permeation chromatography using a polystyrene standard. The theoretical epoxy equivalent weight based on solids was about 235 and the theoretical carbamate equivalent weight based on solids was about 24,616.

EXAMPLE H

An epoxy-functional acrylic polymer containing 35 weight percent glycidyl methacrylate and in which the monomer mixture of Example A (1.9 weight percent HEMA-IPDI-hydroxypropyl carbamate monomer) was used in place of a portion of the methyl methacrylate, was prepared according to the procedure of Example F. The reaction product had a solids content of about 74% and a weight average molecular weight of about 3668 as determined by gel permeation chromatography using a polystyrene standard. The theoretical epoxy equivalent weight based on solids was about 408 and the theoretical carbamate equivalent weight based on solids was about 16,485.

EXAMPLE I

An epoxy-functional acrylic polymer containing 60 weight percent glycidyl methacrylate and 1.9 weight percent HEMA-IPDI-butanol monomer of Example B was prepared according to the procedure of Example G. The reaction product had a solids content of about 62.5% and a weight average molecular weight of about 2557 as determined by gel permeation chromatography using a polystyrene standard. The theoretical epoxy equivalent weight based on solids was about 235 and the theoretical urethane equivalent weight based on solids (and the terminal urethane group) was about 22,257.

EXAMPLE J

An epoxy-functional acrylic polymer containing 35 weight percent glycidyl methacrylate and 1.9 weight percent HEMA-IPDI-butanol monomer of Example B was prepared according to the procedure of Example H. The reaction product had a solids content of about 74% and a weight average molecular weight of about 2700 as determined by gel permeation chromatography using a polystyrene standard. The theoretical epoxy equivalent weight based on solids was about 408 and the theoretical urethane equivalent weight based on solids (and the terminal urethane group) was about 14,910.

EXAMPLE K

An epoxy-functional acrylic polymer containing 60 weight percent glycidyl methacrylate and 1.9 weight percent HEMA-IPDI-methanol monomer of Example C was prepared according to the procedure of Example G. The reaction product had a solids content of about 62.5% and a weight average molecular weight of about 2431 as determined by gel permeation chromatography using a polystyrene standard. The theoretical epoxy equivalent weight based on solids was about 235 and the theoretical urethane equivalent weight based on solids (and the terminal urethane group) was about 20,069.

EXAMPLE L

An epoxy-functional acrylic polymer containing 35 weight percent glycidyl methacrylate and 1.9 weight percent HEMA-IPDI-methanol monomer of Example C was prepared according to the procedure of Example H. The reaction product had a solids content of about 74%. The theoretical epoxy equivalent weight based on solids was about 408 and the theoretical urethane equivalent weight based on solids (and the terminal urethane group) was about 13,440.

EXAMPLE M

An epoxy-functional acrylic polymer containing 60 weight percent glycidyl methacrylate and 1.9 weight percent HEMA-IPDI-lauryl alcohol monomer of Example D was prepared according to the procedure of Example G. The reaction product had a solids content of about 62.5% and a weight average molecular weight of about 2785 as determined by gel permeation chromatography using a polystyrene standard. The theoretical epoxy equivalent weight based on solids was about 235 and the theoretical urethane equivalent weight based on solids (and the terminal urethane group) was about 28,118.

EXAMPLE N

An epoxy-functional acrylic polymer containing 35 weight percent glycidyl methacrylate and 1.9 weight percent HEMA-IPDI-lauryl alcohol monomer of Example D was prepared according to the procedure of Example H. The reaction product had a solids content of about 74% and a weight average molecular weight of about 2580 as determined by gel permeation chromatography using a polystyrene standard. The theoretical epoxy equivalent weight based on solids was about 408 and the theoretical urethane equivalent weight based on solids (and the terminal urethane group) was about 18,830.

EXAMPLE O

A 1-octene/maleic anhydride/ethanol copolymer was prepared as follows:

1821.6 grams (16.23 moles) of 1-octene was charged to a suitable reactor and heated to reflux. As the 1-octene was held at the reflux temperature of 120° C., a first mixture of 458.9 grams of benzoyl peroxide (available as 78 percent by weight aqueous solution from Pennwalt Corporation as LUCIDOL 78) and 3781.8 grams of butyl acetate was added over a period of three hours. Beginning half an hour after the start of the first addition, a second mixture of 794.8 grams (8.1 moles) of maleic anhydride and 1890.9 grams of butyl acetate was added over a period of two hours. After completion of the additions, the reaction mixture was held at reflux for one hour, after which 5457 grams of solvent were removed by distillation. The reaction product was a 1-octene/maleic anhydride copolymer with a solids content of about 75.9%, a number average molecular weight of about 1061 and a weight average molecular weight of about 2731 as determined by gel permeation chromatography using a polystyrene standard.

6640 grams of the 1-octene/maleic anhydride copolymer, 1584 grams of denatured ethanol, and 4 grams dimethyl ethanolamine was added to a suitable reactor. The reaction mixture was heated to 70° C. and held to a constant acid value. Solvent was distilled off at 80° C. until the reaction product had a Gardner-Holdt viscosity of U. The solid acid equivalent weight of the reaction product was about 256.

EXAMPLE P

A polyacid half-ester of trimethylolpropane and methylhexahydrophthalic anhydride was prepared from the following ingredients:

| Ingredient | Weight in grams |
| --- | --- |
| Trimethylolpropane (TMP) | 588.1 |
| Methylhexahydrophthalic anhydride (MHHPA) | 2208.5 |
| Methyl isobutyl ketone (MIBK) | 1198.4 |
| Ethyl alcohol | 279.2 |

The TMP and 1065.4 grams of MIBK were charged to a reaction vessel and heated under nitrogen to 115° C. The MHHPA was added over a period of two hours at the 115° C. temperature. The remaining MIBK was added as a rinse and the reaction held at 115° C. for 4 hours. The reaction mixture was cooled to 100° C. and the ethyl alcohol was added. The reaction mixture was then heated to 105° C. and held for two hours, followed by stripping to a temperature of 125° C. to remove a total of 495 grams of ethyl alcohol. After cooling to room temperature, the reaction mixture was adjusted to a solids content of about 69.9% with 215 grams MIBK. The acid equivalent weight of the reaction product was about 205.

The following examples (1–20) show the preparation of various clear film-forming compositions prepared with epoxy-containing acrylic polymers of Examples E–N and polyacid curing agents. The coating compositions were evaluated in color-plus-clear applications.

Examples 1–4 were for the purposes of control and were made with the polyepoxides of Examples E and F which did not contain pendant carbamate or urethane groups of the invention.

EXAMPLE 1 (Control)

A clear film-forming composition having an epoxy to acid equivalent ratio of 0.8:1.0 was prepared by mixing together the following ingredients:

| Ingredient | Resin Solids in grams | Equivalent Weight epoxy or acid | Weight in grams |
| --- | --- | --- | --- |
| TINUVIN 328[1] | 2.50 | | 5.50 |
| TINUVIN 123[2] | 0.34 | | 0.34 |
| MULTIFLOW[3] | 0.03 | | 0.06 |
| Polybutyl acrylate[4] | 0.50 | | 0.82 |
| n-Amyl propionate | | | 14.50 |
| DOWANOL PM[5] | | | 6.10 |
| Ethanol | | | 5.50 |
| 60% epoxy containing acrylic of Example E | 31.3 | 235 | 50.08 |
| 35% epoxy containing acrylic of Example F | 17.6 | 408 | 23.8 |
| Pentaerythritol/ MHHPA[6] | 32.5 | 217 | 45.8 |
| 1-octene/maleic anhydride/ethanol half-ester of Example O | 10.5 | 256 | 14.8 |
| Isostearic acid | 2.8 | 280 | 2.8 |
| R-812 silica in TMP/ MHHPA half-ester of Example P[7] | 4.4 | 205 | 12.6 |

[1]Substituted benzotriazole UV light stabilizer available from Ciba Geigy Corporation.
[2]Sterically hindered tertiary amine light stabilizer available from Ciba Geigy Corporation.
[3]Polymeric flow control agent made of 75% by weight 2-ethyl hexyl acrylate, 25% by weight ethyl acrylate with a number average molecular weight of about 7934, 50% solids in xylene, available from Monsanto Co.
[4]Flow control agent having a weight average molecular weight of about 6700 and a number average molecular weight of about 2600, made in xylene at 62.5% solids.
[5]Propylene glycol methyl ether available from Dow Chemical Company.

-continued

| Ingredient | Resin Solids in grams | Equivalent Weight epoxy or acid | Weight in grams |
|---|---|---|---|
| [6]Reaction product of 1 mole of pentaerythritol and 3.92 moles of methyl hexahydrophthalic anhydride at 71% solids in a 50-50 mixture of n-propanol and ethyl 3-ethoxypropionate, having an acid equivalent weight of about 217 based on solids (polyacid curing agent). | | | |
| [7]Colloidal silica powder available from Degussa Company, used for sag control (one (1) gram pigment solids). | | | |

EXAMPLE 2 (Control)

A clear film-forming composition having an epoxy to acid equivalent ratio of 1.1:1.0 was prepared by mixing together the following ingredients:

| Ingredient | Resin Solids in grams | Equivalent Weight epoxy or acid | Weight in grams |
|---|---|---|---|
| TINUVIN 328 | 2.50 | | 5.50 |
| TINUVIN 123 | 0.34 | | 0.34 |
| MULTIFLOW | 0.03 | | 0.06 |
| Polybutyl acrylate | 0.50 | | 0.82 |
| n-Amyl propionate | | | 14.50 |
| DOWANOL PM | | | 6.10 |
| Ethanol | | | 5.50 |
| 60% epoxy containing acrylic of Example E | 36.65 | 235 | 58.65 |
| 35% epoxy containing acrylic of Example F | 20.5 | 408 | 27.7 |
| Pentaerythritol/ MHHPA | 25.15 | 217 | 35.4 |
| 1-octene/maleic anhydride/ethanol half-ester of Example O | 10.5 | 256 | 14.8 |
| Isostearic acid | 2.8 | 280 | 2.8 |
| R-812 silica in TMP/ MHHPA half-ester of Example P | 4.4 | 205 | 12.6 |

EXAMPLE 3 (Control)

A clear film-forming composition having an epoxy to acid equivalent ratio of 1.2:1.0 was prepared by mixing together the following ingredients:

| Ingredient | Resin Solids in grams | Equivalent Weight epoxy or acid | Weight in grams |
|---|---|---|---|
| TINUVIN 328 | 2.50 | | 5.50 |
| TINUVIN 123 | 0.34 | | 0.34 |
| MULTIFLOW | 0.03 | | 0.06 |
| Polybutyl acrylate | 0.50 | | 0.82 |
| n-Amyl propionate | | | 14.50 |
| DOWANOL PM | | | 6.10 |
| Ethanol | | | 5.50 |
| 60% epoxy containing acrylic of Example E | 37.98 | 235 | 60.76 |
| 35% epoxy containing acrylic of Example F | 21.29 | 408 | 28.77 |
| Pentaerythritol/ MHHPA | 22.94 | 217 | 32.3 |
| 1-octene/maleic anhydride/ethanol half-ester of Example O | 10.5 | 256 | 14.8 |
| Isostearic acid | 2.8 | 280 | 2.8 |
| R-812 silica in TMP/ MHHPA half-ester of Example P | 4.4 | 205 | 12.6 |

EXAMPLE 4 (Control)

A clear film-forming composition having an epoxy to acid equivalent ratio of 1.3:1.0 was prepared by mixing together the following ingredients:

| Ingredient | Resin Solids in grams | Equivalent Weight epoxy or acid | Weight in grams |
|---|---|---|---|
| TINUVIN 328 | 2.50 | | 5.50 |
| TINUVIN 123 | 0.34 | | 0.34 |
| MULTIFLOW | 0.03 | | 0.06 |
| Polybutyl acrylate | 0.50 | | 0.82 |
| n-Amyl propionate | | | 14.50 |
| DOWANOL PM | | | 6.10 |
| Ethanol | | | 5.50 |
| 60% epoxy containing acrylic of Example E | 39.4 | 235 | 63.52 |
| 35% epoxy containing acrylic of Example F | 21.9 | 408 | 29.59 |
| Pentaerythritol/ MHHPA | 21.2 | 217 | 29.71 |
| 1-octene/maleic anhydride/ethanol half-ester of Example O | 10.5 | 256 | 14.8 |
| Isostearic acid | 2.8 | 280 | 2.8 |
| R-812 silica in TMP/ MHHPA half-ester of Example P | 4.4 | 205 | 12.6 |

EXAMPLES 5–8

Clear film-forming compositions having epoxy to acid ratios of 0.8:1.0, 1.1:1.0, 1.2:1.0, and 1.3:1.0, respectively, were prepared as in Examples 1–4 but using the HEMA-IPDI-hydroxypropyl carbamate containing epoxy acrylic resins of Examples G and H in place of the epoxy acrylic resins of Examples E and F.

EXAMPLES 9–12

Clear film-forming compositions having epoxy to acid ratios of 0.8:1.0, 1.1:1.0, 1.2:1.0, and 1.3:1.0, respectively, were prepared as in Examples 1–4 but using the HEMA-IPDI-butanol containing epoxy acrylic resins of Examples I and J in place of the epoxy acrylic resins of Examples E and F.

EXAMPLES 13–16

Clear film-forming compositions having epoxy to acid ratios of 0.8:1.0, 1.1:1.0, 1.2:1.0, and 1.3:1.0, respectively, were prepared as in Examples 1–4 but using the HEMA-IPDI-methanol containing epoxy acrylic resins of Examples K and L in place of the epoxy acrylic resins of Examples E and F.

EXAMPLES 17–20

Clear film-forming compositions having epoxy to acid ratios of 0.8:1.0, 1.1:1.0, 1.2:1.0, and 1.3:1.0, respectively, were prepared as in Examples 1–4 but using the HEMA-IPDI-lauryl alcohol containing epoxy acrylic resins of Examples M and N in place of the epoxy acrylic resins of Examples E and F.

The film-forming compositions of Examples 1–20 were applied to a pigmented base coat to form color-plus-clear composite coatings over electrocoated steel substrates. The pigmented base coat is commercially available from PPG Industries, Inc. and identified as NHU-9517. The base coat was pigmented black in color, and was reduced to 17.8 seconds #4 Ford cup viscosity using butyl acetate. The electrocoat used on the steel is commercially available from PPG Industries, Inc. and is identified as ED-11.

The base coat was spray applied in two coats to electrocoated steel panels at a temperature of about 75° F. (24° C.). A ninety second flash time was allowed between the two base coat applications. After the second base coat application, a flash time of approximately five minutes was allowed at 75° F. (24° C.) before the application of the clear coating composition. The viscosity of the clear coating compositions was reduced to 24 seconds #4 Ford cup using xylene. The clear coating compositions of Examples 1–20 were each applied to two basecoated panels in two coats with a ninety second flash at 75° F. (24° C.) allowed between coats. Final dry film thickness was about 1.6 to 1.8 mils. The composite coating was allowed to air flash at 75° F. (24° C.) for ten to fifteen minutes before baking. One panel was baked at 285° F. (141° C.) and the other at 315° F. (157° C.) for 30 minutes to cure both the base coat and clear coat. The panels were baked in a horizontal position. All panels were then recoated with the same clear coating compositions at the same film thickness. After allowing a flash time of about 10 minutes at 75° F. (24° C.), both panels were baked at 285° F. (141° C.) for 30 minutes. Intercoat adhesion was measured by scribing the coated panels with a "cross-hatch" pattern and securely applying a piece of adhesive tape onto the scribe. The tape was then removed and the substrate examined for removal of the coating layers. A rating on a scale of 0 (worst) to 8 (best) was given based on the area and layers of coating material removed by the tape. A rating of 0 indicates adhesion failure. The properties of the composite coatings are reported in Table I below.

TABLE I

| Example | Epoxy:acid, eq. | 285° F. Bake | 315° F. Bake |
|---------|-----------------|--------------|--------------|
| 1 | 0.8:1.0 | 0 | 0 |
| 2 | 1.1:1.0 | 0 | 0 |
| 3 | 1.2:1.0 | 0 | 0 |
| 4 | 1.3:1.0 | 2 | 0 |
| 5 | 0.8:1.0 | 2 | 0 |
| 6 | 1.1:1.0 | 8 | 1 |
| 7 | 1.2:1.0 | 8 | 4 |
| 8 | 1.3:1.0 | 8 | 7 |
| 9 | 0.8:1.0 | 4 | 0 |
| 10 | 1.1:1.0 | 8 | 2 |
| 11 | 1.2:1.0 | 8 | 4 |
| 12 | 1.3:1.0 | 8 | 7 |
| 13 | 0.8:1.0 | 1 | 0 |
| 14 | 1.1:1.0 | 4 | 0 |
| 15 | 1.2:1.0 | 5 | 3 |
| 16 | 1.3:1.0 | 5 | 4 |
| 17 | 0.8:1.0 | 1 | 0 |
| 18 | 1.1:1.0 | 4 | 1 |
| 19 | 1.2:1.0 | 6 | 2 |
| 20 | 1.3:1.0 | 7 | 4 |

What is claimed is:

1. A process for applying a composite coating to a substrate which comprises applying to the substrate a colored film-forming composition to form a base coat and applying to said base coat a clear film-forming composition to form a transparent top coat over the base coat, characterized in that the clear film-forming composition is a crosslinkable composition comprising a polyepoxide and a polyacid curing agent, wherein the polyepoxide is a polyepoxide-containing polymer which contains one or more pendant groups of the structure:

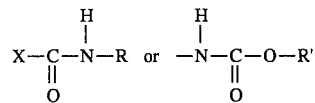

where X is

or —O and R is H or alkyl of 1–18 carbon atoms or R is bonded to X and forms part of a five- or six-membered ring and R' is alkyl of 1–18 carbon atoms.

2. The process of claim 1 where R is H or alkyl of 1–6 carbon atoms or R is bonded to X and forms part of a 5 or 6 membered ring and R' is alkyl of 1–6 carbon atoms.

3. The process of claim 2 in which X is —O and R is selected from the group consisting of H and alkyl having 1–6 carbon atoms.

4. The process of claim 2 in which X is

R is bonded to X and is —CH$_2$—CH$_2$.

5. The process of claim 1 in which the polyepoxide-containing polymer is an epoxy group-containing acrylic polymer.

6. The process of claim 5, in which the epoxy group-containing acrylic polymer is a copolymer of glycidyl acrylate or glycidyl methacrylate with at least one other copolymerizable ethylenically unsaturated monomer.

7. The process of claim 1 in which the polyepoxide-containing polymer has an equivalent weight of from about 5000 to 100,000 based on equivalents of pendant groups. polymer.

8. The process of claim 1, wherein the polyacid curing agent is selected from the group consisting of a carboxylic acid group-containing oligomer and polymer.

9. A substrate coated by the process of claim 1.

10. The process of claim 8, in which for each equivalent of carboxyl there are 0.8 to 1.5 equivalents of epoxy.

11. The process of claim 1, wherein the polyacid curing agent is selected from the group consisting of a carboxylic acid group-containing oligomer and polymer having the acid groups and wherein the polyacid curing agent is reactive in a range of equivalents with the polyepoxide that has said pendant groups so that for each equivalent of carboxyl there is 0.3 to 3.0 equivalent of epoxy to form a crosslinked coating.

* * * * *

UNITED STATES PATENT AND TRADEMARK OFFICE
CERTIFICATE OF CORRECTION

PATENT NO. : 5,547,757
DATED : August 20, 1996
INVENTOR(S) : Swarup et al.

It is certified that error appears in the above-identified patent and that said Letters Patent is hereby corrected as shown below:

Column 22,

Claim 7, line 4: delete the word "polymer."

Signed and Sealed this

Third Day of December, 1996

BRUCE LEHMAN

Attest:

Attesting Officer

Commissioner of Patents and Trademarks